Sept. 18, 1928.          E. T. FERNGREN          1,684,438
PROCESS AND APPARATUS FOR MAINTAINING SHEET GLASS TO WIDTH
Filed Dec. 16, 1925
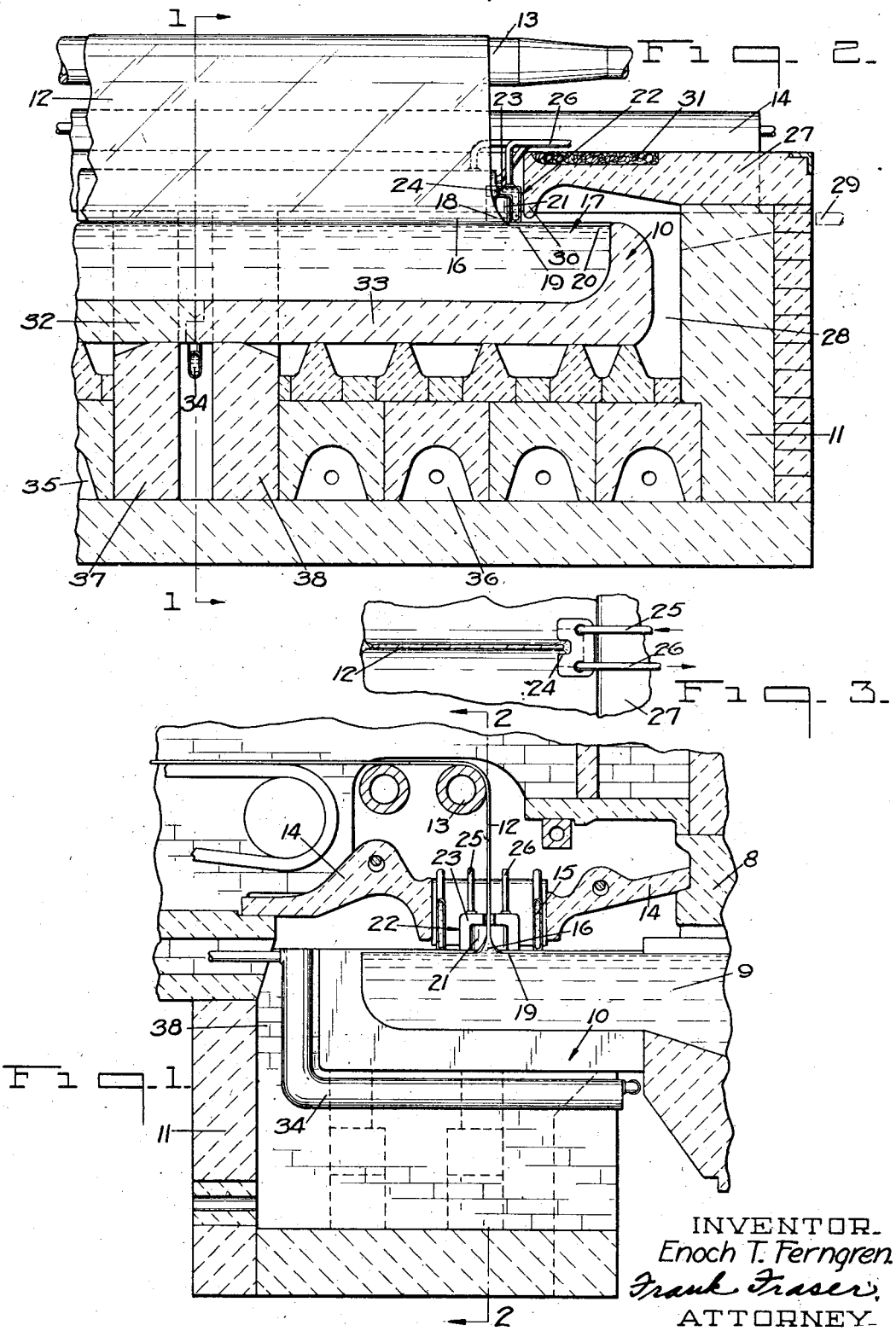
INVENTOR.
Enoch T. Ferngren
Frank Fraser
ATTORNEY.

Patented Sept. 18, 1928.

1,684,438

UNITED STATES PATENT OFFICE

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

PROCESS AND APPARATUS FOR MAINTAINING SHEET GLASS TO WIDTH.

Application filed December 16, 1925   Serial No. 75,719.

The present invention relates to sheet glass apparatus, and has particular reference to an improved process and apparatus for holding a sheet of glass to width.

An object of the present invention is to provide a process and apparatus for continuously drawing a sheet of glass from a mass of molten glass, including means whereby the sheet may be held to width.

Another object of the invention resides in the less unrestricted flow movement of the glass maintained at the source of the sheet edges.

A further object of the invention is to reduce the amount of waste at the sheet edges, and thus increase the net width of the sheet.

Other objects and advantages of the invention will become apparent during the course of the following description.

In the drawings wherein like numerals are employed to designate like parts throughout the same, Fig. 1 is a vertical longitudinal section through a portion of the sheet glass drawing apparatus showing the improvements, taken substantially on line 1—1 of Fig. 2, Fig. 2 is a transverse sectional elevation on line 2—2 of Fig. 1, clearly showing the improvements in position, and Fig. 3 is a fragmental plan view of the improvements.

Referring to the drawings in detail, the numeral 8 designates a tank furnace in which a supply of molten glass 9 is maintained. In open communication with the tank furnace is a draw pot 10 adapted to receive the molten glass. The pot 10 is supported in a heated chamber 11 which serves to maintain the molten glass therein at the proper drawing temperature.

From the molten glass in the draw pot 11 a continuous sheet of glass 12 is vertically drawn and then bent into the horizontal over the bending roll 13 as disclosed in the patent to Colburn 1,248,809, granted Dec. 4, 1917. The improvements covered by the present invention are shown in use in connection with the Colburn process of drawing sheet glass, but are not necessarily limited thereto as they may be applied to most any glass drawing process.

On both sides of the sheet 12 are positioned cover or lip tiles 14, extending over the entire width of the draw pot, which maintain the surface glass 9 thereunder at a relatively high temperature. Immediately in front of the lip tiles and in close relationship to the surface glass are positioned vertical coolers 15, extending only approximately the width of the sheet 12, which protect the sheet from highly heated air currents escaping from the lip tiles 14. The coolers, with the aid of the surrounding atmosphere serve as a suitable means for further conditioning the glass as it passes under the lip tiles, which glass is finally drawn into the sides of the sheet.

There is a tendency on the part of the sheet 12 as it is drawn to narrow at its base, and unless means are provided for overcoming such a tendency the sheet will soon pull to a string or thread. It is the principal object of this invention to provide means for counteracting the narrowing tendency of the sheet.

At the base of the sheet 12 and extending transversely thereof is naturally formed a gradually tapering body of glass 16, known in the art as a meniscus.

Referring to Fig. 2 in the drawing, it will be noticed that the extreme width of the sheet meniscus 16 is considerably less than the width of the draw pot, thus leaving a relatively large body of glass 17 between the meniscus edge 18 and the side wall of the draw pot.

This body of glass 17 comprises two adjoining glass pools or areas 19 and 20, having relative viscosities, both of which lie within the same transverse vertical plane as the sheet meniscus 16, the glass pool 19 having a greater viscosity nearest the meniscus edges and less viscous or more fluent glass pool 20 adjacent the side walls of the pot.

The glass pool 19 and meniscus edges 18, and the source of the sheet edge may be maintained in a more or less viscous state by the chilling effect of the relatively cold atmosphere enveloping them, created by the air pocket 21 of the cooler 22. The top 23 of the cooler prevents objectionable air currents from passing upwardly along the sheet edge and is provided with a slot 24 through which the sheet edge may freely pass. A cooling medium circulates through the cooler by means of the pipes 25 and 26.

The glass pool 20 may be maintained in a less viscous or more fluent state in the same manner as the glass under the lip tiles 14 is maintained, by suitably supporting above it, between the two lip tiles 14, the cover tile 27. The cover tile 27 is preferably supported on the side walls of the heated chamber 11 in order that portion of the heat from this chamber may be utilized in heating the glass pool 20 by permitting the heat from the chamber to escape through the passages 28 provided therefor, and deflecting the heat on the glass pool 20 by the cover tile. Burners 29, suitably positioned at the side walls of the heated chamber, may also be used as another means for heating the glass pool 20. To prevent intense heat from coming into contact with the cooler 22, the cover tile 27 is provided with a protecting apron 30 at its end nearest the cooler, said apron also aiding in directing the intensity of the heat on the glass pool 20. The heat when escaping from beneath the cover tile is cooled by the cooler 22, thus causing no ill effect on the sheet. In order to reduce the heat losses due to radiation, the cover tiles are covered with a layer of insulation 31 directly above the glass pool 20.

Owing to the exceptional width of the draw pot, partly made necessary by the bodies of glass 17 at the meniscus edges, it is preferably made in two sections 32 and 33, joined longitudinally at the center. Beneath the joint made by the two pot sections is positioned a cooler 34 that freezes the molten glass collected in the joint, thus preventing leakage. The glass area, lying longitudinally at the center of the pot of such width, will normally be considerably hotter than the glass which lies at each side of it. In order to maintain a more balanced temperature condition between these glass areas, the heated chamber beneath the pot is divided in two compartments 35 and 36 by fire walls 37 and 38. These fire walls eliminate the added heating of the central area of glass thereabove from beneath, while the glass at each side receives its usual heat treatment from the respective compartments 35 and 36, thus equalizing the fluency and mobility of the glass supplying the sheet meniscus 16.

With the arrangement of the means for heating and cooling of the glass entering the sheet, it will be apparent there is continuously formed a shallow floating body or island of relatively cold and more cohesive glass completely surrounding and supplying both sides and edges of the sheet and that circumscribing this body of glass is a more fluent or hotter glass body which supplies, and whose movement is controlled by, the colder body of glass as it is drawn into the sheet.

In producing a more viscous glass at the base of the sheet edges sufficient to create the necessary drag on the edges, while at the same time permitting a free quantity movement to the glass body flowing toward the meniscus at the sheet edges, a new process and apparatus is presented for overcoming the narrowing tendency of the sheet at its base. The heat absorbing and the cooling atmosphere created by the cooler 22 is just as effective toward properly conditioning the glass enveloped by it, as if the cooler was in direct contact with this glass. In fact, the cooling atmosphere may be more satisfactory as it permits the more natural positioning of the glass in and entering the meniscus edges. By placing the edge cooler 22 in different positions, it will be possible to create different viscosities in the glass surrounded by it, and thus affect the drag and tension at the sheet edges.

In the past the flow movement of the glass at the sheet edges has been somewhat restricted by the apparatus used for holding the sheet to width. Therefore some of this glass at the meniscus edges along the side walls of the draw pot would become stagnant and in time devitrified, thus forming dog metal on the side walls of the pot. This dog metal would later break away from the pot and be drawn into the sheet. In accordance with the present invention, means are provided to overcome stagnation of the glass at the side wall of the draw pot.

A continuous sheet of glass drawn, using the improved process, it is believed will be of greater net width than heretofore as the percentage of edge glass which is ordinarily trimmed off can be reduced, this percentage being reduced, because of the fact that the sheet is drawn without the aid of any edge contacting or forming means, while in the past such means has caused considerable waste. It may further be found that the edge glass which is trimmed off from the sheet proper, drawn by use of the improvements covered by the present invention, may have a commercial value, owing to the fact that it is free from mars or impressions usually present when edge contacting means are employed.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. The process of drawing sheet glass from a pot, consisting in containing a mass of molten glass, forming a sheet supplying meniscus thereon, and producing adjoined glass areas having relative viscosities at the base of the meniscus edges, the glass having the lowest viscosity being adjacent the pot walls.

2. The process of drawing sheet glass, consisting in containing a mass of molten glass, forming a sheet supplying meniscus thereon, and producing adjacent the meniscus edges adjoined glass areas having relative viscosities, the glass area having the greatest viscosity being nearest the meniscus edges.

3. The process of continuously drawing sheet glass, consisting in containing a mass of molten glass, forming a sheet supplying meniscus upon the surface thereof, continuously cooling the glass area supplying the meniscus edges, and continuously heating the glass area adjoining the first mentioned glass area.

4. The process of holding to width a sheet of glass drawn continuously from a mass of molten glass, consisting in continuously forming a relatively cold body of moving glass at the base of the sheet edges thus creating a tension in the sheet edges and continuously forming a relatively hot body of moving glass adjacent said colder body of glass.

5. The process of holding to width a sheet of glass drawn continuously from a mass of molten glass, consisting in continuously maintaining a relatively fixed cold atmosphere around a pool of moving glass at the base of the sheet edges, and maintaining a fixed cooling atmosphere around the sheet edges while being formed, thus creating a greater tension in the sheet edges than in those portions of the sheet between the edges.

6. In sheet glass drawing apparatus, a draw pot containing a mass of molten glass, means for drawing a sheet of glass therefrom, means for maintaining a relatively cold body of glass at the base of the sheet edges, and means for maintaining a relative hot body of glass between said cold body of glass and the sides of the draw pot.

7. In sheet glass drawing apparatus, a draw pot containing a mass of molten glass, means for drawing a sheet of glass therefrom, means for maintaining a constant supply of relatively cold surface glass at the base of the sheet which is continuously drawn into the sheet edges, and means for maintaining a constant supply of relatively hot or more fluent surface glass at the edges for replacing the relatively cold glass supply as it is drawn away.

8. In sheet glass drawing apparatus, a cooler having a pocket therein which creates a cooling atmosphere upon the surface glass at base of the sheet edges, and a top on the cooler to retard heat from escaping upwardly from the pocket, the top having a slot therein through which the sheet edges may freely pass.

9. In sheet glass drawing apparatus, a cooler having a pocket therein which creates a cooling atmosphere upon the surface glass at base of the sheet edges, a top on the cooler to retard heat from escaping upwardly from the pocket, the top having a slot therein through which the sheet edges may freely pass, and means for passing a cooling medium through said cooler.

10. In sheet glass drawing apparatus, a pot for containing a mass of molten glass, and having a sheet supplying meniscus formed upon the surface thereof from which a sheet is drawn, a cooling means at the extremities of said meniscus edges, means beneath the pot for heating the glass, an insulated cover tile above the glass between said cooling means and side of said pot for reflecting and deflecting heat upon the surface of this glass, and means for protecting said cooling means and sheet edges from any intense heat.

11. The process of continuously drawing sheet glass, consisting in drawing a sheet of glass from a mass of molten glass, producing an unrestricted flow movement to the glass entering the sides and edges of the sheet, and fixing a localized cooling atmosphere around said glass entering and in said sheet edges, sufficient to retard the velocity thereof and thus overcome the tendency of said sheet to narrow at its base.

12. In a sheet glass drawing apparatus, a sectional draw pot containing molten glass, a heated chamber beneath the pot, a plurality of separately heated compartments in said chamber, and fire walls separating the heated compartments.

13. In a sheet glass drawing apparatus, a draw pot having a plurality of sections containing molten glass, means for holding the sheet to width, a heated chamber beneath the draw pot, and means within said chamber for equalizing the temperature of the glass in the pot.

14. In a sheet glass drawing apparatus, a draw pot having a plurality of sections containing molten glass, a heated chamber beneath the draw pot, fire walls separating said heated chamber into separate compartments and also supporting the sections of said pot at the juncture thereof, and a cooler between said fire walls to prevent the leakage of molten glass at said juncture.

Signed at Toledo, in the county of Lucas, and State of Ohio, this 15th day of December, 1925.

ENOCH T. FERNGREN.